(12) United States Patent
Bajoria (10) Patent No.: US 11,151,020 B1
(45) Date of Patent: Oct. 19, 2021

(54) METHOD AND SYSTEM FOR MANAGING DEPLOYMENT OF SOFTWARE APPLICATION COMPONENTS IN A CONTINUOUS DEVELOPMENT PIPELINE

(71) Applicant: INTUIT INC., Mountain View, CA (US)

(72) Inventor: Sparsh Bajoria, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/525,334

(22) Filed: Jul. 29, 2019

(51) Int. Cl.
| | |
|---|---|
| *G06F 9/445* | (2018.01) |
| *G06F 11/36* | (2006.01) |
| *G06F 9/54* | (2006.01) |
| *G06F 16/901* | (2019.01) |
| *G06F 8/60* | (2018.01) |

(52) U.S. Cl.
CPC ............ *G06F 11/3672* (2013.01); *G06F 8/60* (2013.01); *G06F 9/54* (2013.01); *G06F 16/9024* (2019.01)

(58) Field of Classification Search
CPC .... G06F 11/3672; G06F 16/9024; G06F 8/60; G06F 9/54
USPC ........................................................ 717/124
See application file for complete search history.

(56) References Cited

U.S. PATENT DOCUMENTS 10,510,007 B2 * 12/2019 Singhal ............... G06F 11/3447
2019/0317736 A1 * 10/2019 Wood ........................ G06F 8/71

\* cited by examiner

*Primary Examiner* — Chuck O Kendall
(74) *Attorney, Agent, or Firm* — Patterson + Sheridan, LLP (57) ABSTRACT

Certain aspects of the present disclosure provide techniques for managing deployment of application components in a continuous development pipeline based on a comparison of execution graphs generated from execution of functions in production and test environments of the continuous development pipeline. Embodiments include generating a first graph representation of a function from log data captured during execution of the function in a production environment and a second graph representation of the function from log data captured during execution of the function in a test environment. Differences between the first and second graph representations are identified, and based on the identified differences, a system takes one or more actions to manage deployment of software application components implementing the function from the test environment to the production environment.

20 Claims, 5 Drawing Sheets

METHOD AND SYSTEM FOR MANAGING DEPLOYMENT OF SOFTWARE APPLICATION COMPONENTS IN A CONTINUOUS DEVELOPMENT PIPELINE

INTRODUCTION

Aspects of the present disclosure generally relate to a continuous development pipeline for software applications, and more specifically to using graph representations of functions implemented in a software application to manage deployment of software applications or components thereof in a continuous development pipeline.

BACKGROUND

Continuous development pipelines, which may also be known as "blue-green deployments" of software applications, generally provide a platform by which improvements and new functionality in software applications may be deployed for use in a production system. Generally, these continuous development pipelines include a production environment and a test environment. The production environment generally hosts services and applications for consumption and execution by users of the software application (e.g., by customers subscribing to an application deployed as a subscription service), and the test environment generally hosts services and applications that are under development by an application developer. The application developer may modify existing functions and add new functions to the services or applications deployed in the test environment. To deploy the test version of the application to a production environment for use by users of the application, developers may switch the designations of the test and production environments such that the test environment becomes the production environment and the production environment becomes the test environment.

Prior to deploying a test version of an application or service to a production environment, developers of applications or services may execute various tests within the test environment. These tests may be executed to ensure that modifications to existing functionality has not degraded application performance or rendered the application unusable and that new functions added to the application or service has not rendered other functionality within the application or service unusable. Testing of applications or services may, for example, be performed by executing pre-configured tests against the test version of the application or service to compare the output of the production version and test version of the application or service. Generally, if the output of the production and test versions of the application or service for a given test match, a developer can assume that modifications to the application or service did not affect the results generated by the application or service for the given test. However, the generation of identical results for a given test by production and test versions of the application may not indicate that other operational errors or performance issues present in a production version of the application or service were rectified or that new operational errors or performance issues were introduced into the test version of the application or service. These operational errors or performance issues may include memory leaks, superfluous application programming interface (API) calls, duplicated database calls, or other errors. If the output of the production and test versions for a given test differs, a developer can examine the modifications to identify the causes of the differing output. Testing software applications, however, may be a time-consuming process, which may delay the deployment of modifications and new features to a production environment.

Accordingly, techniques are needed to accelerate deployment of applications and services in a continuous development pipeline.

BRIEF SUMMARY

Certain embodiments provide a computer-implemented method for managing deployment of software application components in a continuous development pipeline. The method generally includes generating a first graph representation of a function from log data captured during execution of the function in a production environment and a second graph representation of the function from log data captured during execution of the function in a test environment. Differences between the first and second graph representations are identified, and based on the identified differences, one or more actions are taken to manage deployment of software application components implementing the function from the test environment to the production environment.

Other embodiments provide a system comprising a processor and a non-transitory computer-readable memory storing instructions that, when executed by the processor, perform an operation for managing deployment of software application components in a continuous development pipeline. The operation generally includes generating a first graph representation of a function from log data captured during execution of the function in a production environment and a second graph representation of the function from log data captured during execution of the function in a test environment. Differences between the first and second graph representations are identified, and based on the identified differences, one or more actions are taken to manage deployment of software application components implementing the function from the test environment to the production environment.

Still further embodiments provide a computer-readable medium having instructions stored thereon which, when executed, performs an operation for managing deployment of software application components in a continuous development pipeline. The operation generally includes generating a first graph representation of a function from log data captured during execution of the function in a production environment and a second graph representation of the function from log data captured during execution of the function in a test environment. Differences between the first and second graph representations are identified, and based on the identified differences, one or more actions are taken to manage deployment of software application components implementing the function from the test environment to the production environment.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for generating execution graphs for functions in production and test environments of a continuous development pipeline and using the generated execution graphs to control deployment of software applications in the continuous development pipeline. These execution graphs may illustrate various actions performed during execution of a given function and the order in which these actions are performed. The various actions may include, for example, other functions invoked during execution of the given function, database queries performed by the given function, network activity generated by the given function, and so on. These execution graphs may further illustrate data consumed or generated during execution of a function. Based on differences between the execution graphs generated for the given function in the test and production environments, aspects of the present disclosure can control deployment of development versions of a software application in a continuous development pipeline.

By utilizing comparisons between execution graphs generated from data gathered during execution of a function in production and test environments and using the comparisons to manage deployment of software applications, embodiments of the present disclosure may accelerate the deployment of software applications from test to production environments. Generally, based on an assumption that functions in applications deployed in a production environment work as intended, determining that the execution graphs for a function in production and test environments match may serve as a proxy for determining that a function operates as intended and that any changes to a software application in the test environment have not adversely affected the functionality of the software application. Changes in an execution graph generated for a function in a test environment relative to the execution graph generated for the function in a production environment may indicate that a function has been significantly modified between the version deployed in the production environment and the version under development in the test environment. These changes may have various causes, from refactoring or reorganization to enhance performance of the software application to unintended changes that adversely affect the performance or operability of the software application. Because significant modifications to a software application may be indicative of degraded functionality or performance, but need not be, aspects of the present disclosure may identify the changes to the execution graph to a developer of the software application for verification. Responses to presentation of the differences between execution graphs generated for the function in the production and test environments may be used to manage deployment of the software application from a test to a production environment.

Figure 1:
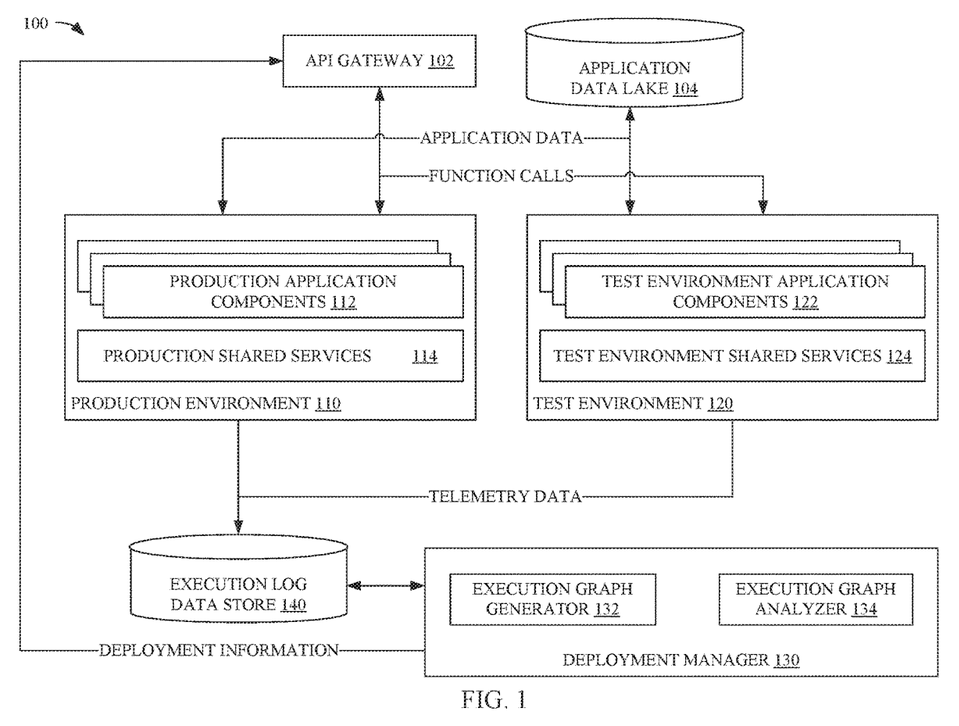
FIG. 1 depicts an example computing environment in which execution graphs are generated and analyzed to control deployment of applications and services in a continuous development pipeline.

Example Deployment of Software Application Components in a Continuous Development Pipeline Based On Execution Graphs FIG. 1 illustrates a software application deployment environment 100 in which execution graphs generated for functions executed in production and test environments in a continuous development pipeline are used to manage deployment of software applications in the continuous development pipeline, according to an embodiment. As illustrated, software application deployment environment 100 includes an application programming interface (API) gateway 102, application data lake 104, production environment 110, test environment 120, deployment manager 130, and execution log data store 140, connected via a network. The network may be a wired or wireless network. In some embodiments, software application deployment environment 100 may be hosted or executed in a cloud computing environment in which components of the software application deployment environment 100 may be hosted or otherwise implemented as appliances or other logical constructs sharing execution time and hardware resources with other components of the software application deployment environment 100 and/or other applications.

API gateway 102 generally receives requests for application content and functionality from one or more client devices and routes the requests to services executing within production environment 110 or test environment 120 for execution. API gateway 102 may be configured, as discussed in further detail below, by deployment manager 130 to designate one environment in the software application deployment environment 100 as a production environment 110 and another environment in the software application deployment environment 100 as a test environment 120, such that requests for application content and functionality from subscribers to a software application service are processed by the production environment 110. Meanwhile, requests for application content and functions from developers of a software application may be processed by the production environment 110 or test environment 120 based on information included in the requests (e.g., flags indicating whether the requests should be processed by an application component executing in production environment 110 or test environment 120). In some embodiments, production environment 110 and test environment 120 may be designated as new versions of an application are developed. In some embodiments, however, production environment 110 and test environment 120 may be defined on more granular basis. For example, individual functions or application components may be designated as either a production version of the function or application component or a test version of the function or application component.

To process a request, API gateway 102 may be configured to route requests to the appropriate location. Generally, API gateway 102 may maintain configuration information, such as a configuration table, identifying the location of the production environment 110 within a computing environment, such as a cloud computing system on which an application is deployed. In some examples, where the production environment 110 and test environment 120 are defined for the entirety of an application API gateway 102 may use a single data entry identifying the location of production environment 110 to route requests to the appropriate computing systems. In another example, API gateway 102 may be configured to route requests to the appropriate location on a per-function or per-component basis. In such an example, API gateway 102 may maintain a routing table identifying the location of the production environment 110 for each function exposed by an application and use the information in the routing table to route received requests to the appropriate location based on the function identified in the request.

Application data lake 104 generally represents user data and other application data that may be generated and consumed during execution of a software application in production environment 110 and/or test environment 120. The contents of application data lake 104 may vary based on the application or services hosted within software application deployment environment 100. In some embodiments, the formats of data stored within application data lake 104 may remain consistent or backward-compatible such that the application code deployed in production environment 110 and/or test environment 120 may use the data already stored in application data lake 104 without generating runtime errors or otherwise degrading the functionality of the application. Application data lake 104 may be implemented, for example, as one or more relational databases, non-relational databases, flat files, or other data structures that may be used to store and access data used by an application deployed in the software application deployment environment 100.

Production environment 110 and test environment 120 are generally representative of different environments in which application code is hosted and executed. Generally, production environment 110 may include application components that have been previously tested and/or verified to perform its functionality as intended and may expose the application components to external users of the application (e.g., subscribers to an application in a software-as-a-service environment). As illustrated, production environment 110 may host production application components 112 and production shared services 114.

Production application components 112 may include services, microservices, and other software routines, scripts, classes, or components that work together to implement the functionality of a software application.

Production shared services 114 may include, for example, lower-level or shared functionality used by various production application components to deliver the functionality of a software application. These shared services may include, for example, configuration dashboards, service registries, data logging services, message services, and other services that may be shared across multiple production application components 112.

Test environment 120 similarly hosts test application components 122 and test shared services 124.

Test application components 122 may include changes to application code relative to production application components 112 representing improvements to existing application functionality or new functions that do not exist in production application components 112.

Likewise, test shared services 124 may include changes to code implementing these shared services relative to production shared services 114. As discussed in further detail below, execution graphs may be generated for functions implemented in production environment 110 and test environment 120 to manage deployment of a software application to a production environment (e.g., switching a production environment to a test environment and switching a test environment to a production environment after verification of application components executing within the test environment).

Generally, during execution of a function provided by production application components 112 or production shared services 114 in production environment 110 or test application components 122 or test shared services 124 in test environment 120, telemetry data may be generated for each action performed during execution of the function. The telemetry or log data may be stored in execution log data store 140 for use by deployment manager 130 in determining whether to deploy a software application or component thereof from a test environment 120 to a production environment 110.

The telemetry data may include, for example, an indication of the execution environment (e.g., production environment 110 or test environment 120) from which the telemetry data was generated, other functions invoked during execution of the function, database calls generated during execution of the function, hypertext transport protocol (HTTP) requests generated during execution of the function, and the like. In some embodiments, the telemetry data may additionally include information about the data consumed or generated during execution of the function. For example, a database call may be decomposed into a graph structure including nodes for information about the database query (e.g., a target database and database table), database columns retrieved through the query, the data retrieved through execution of the query, and the like.

In some embodiments, the telemetry or log data may further include other information that may be used by a developer of the software application to debug or make further developments with respect to the application, such as execution time, error handling procedures triggered during execution of the function, and the like. Generally, the telemetry or log data may be generated such that a hierarchical graph may be generated from the telemetry or log data for any given function executed within a production environment 110 or test environment 120. The data may, for example, be generated as timestamped data identifying the originating function within an application (e.g., within production application components 112, production shared services 114, test application components 122, or test shared services 124) that performed an action. In some embodiments, telemetry data may be stored in a relational database structure and associated with a function invoked by a user through API gateway 102, flat files associated with each function call invoked by a user through API gateway 102, or other data structures that may be used to store and retrieve log data for analysis.

Deployment manager 130 generally generates execution graphs from log data generated during execution of a software application within production environment 110 and test environment 120, analyzes the generated execution graphs for a given function to identify differences in how the given function is executed in production environment 110 and test environment 120, and takes actions to manage deployment of a software application from a test environment 120 to a production environment 110 based on the analysis of the generated execution graphs, as discussed in further detail below. As illustrated, deployment manager 130 includes an execution graph generator 132 and an execution graph analyzer 134.

Execution graph generator 132 is generally configured to obtain telemetry data for a given function from execution log data store 140 and generate execution graphs depicting actions performed to execute the given function in the production environment 110 and test environment 120. To generate an execution graph, execution graph generator 132 may receive, from a developer, information identifying a function to analyze from production environment 110 and test environment 120. The identified function may be, for example, a function that may be invoked by a user of the software application through API gateway 102 or other publicly invokable function in a software application. Based on the identified function, execution graph generator 132 can query execution log data store 140 for log data related to the identified function. For example, execution graph generator 132 can perform a first query to identify various discrete times at which the identified function was executed in production environment 110 and test environment 120. Using records associated with the latest time at which the identified function was executed in production environment 110 and test environment 120, execution graph generator 132 can perform one or more subsequent queries against execution log data store 140 to identify actions performed during execution of the identified function.

In some embodiments, the telemetry data obtained from execution log data store 140 may be filtered to specific data indicative of events that may be indicative of performance degradation or broken functionality within the application. These events may include, for example, system-level events such as database calls (e.g., queries against one or more data stores in application data lake 104), service invocations, invocations of functions on remote computing systems (e.g., representational state transfer (REST) services), and the like. The absence of such an event in a function executing in a test environment may indicate that a system may not work as intended, and where the addition of such events may indicate degraded performance due to the execution of additional operations that may not be needed to successfully execute a function. In another example, the telemetry data obtained from execution log data store 140 may be defined by patterns of events, sources, types of sources, or other information that may be indicative of changes in performance or functionality within the application.

For example, assume that a user wishes to generate execution graphs for a checkout function in an electronic commerce application. Execution graph generator 132 may first query execution log data store 140 to identify discrete instances at which the checkout function was executed in the production environment 110 and test environment 120. Using the latest discrete instance at which the checkout function was executed in production environment 110 and test environment 120 execution graph generator 132 may query execution log data store 140 to obtain telemetry data about actions performed during execution of the checkout function. The log information may reference the latest discrete instances at which the checkout function was executed and may identify the application component or function that invoked a particular action.

Assume, further, that the checkout function invokes an invoice generation function, a payment function, and a shipment generation function; the invoice generation function invokes a database query to store an invoice for future retrieval; the payment function invokes one or more functions for initiating a funds transfer from a user according to user-specified payment information; and the shipment generation function invokes a database query to determine whether a requested item is in stock and a dispatch function for generating a shipment tracking number for an order. Telemetry data in execution log data store 140 for the invoice generation function, payment function, and shipment generation function may identify the checkout function as the invoking function. Meanwhile, telemetry data for the database query to store the invoice may identify the invoice generation function as the invoking function; telemetry data for the one or more funds transfer functions may identify the payment function as the invoking function; and the database query to determine whether a requested item is in stock and the dispatch function may identify the shipment generation function as the invoking function. Telemetry data for each of the functions described above may further include information indicating that the invoice generation function is related to a particular invocation of the checkout function so that a graph representing actions performed in executing a given function can be generated.

Based on the telemetry data stored in execution log data store 140 for the checkout function described above, an execution graph may be generated with a root node representing the user-invoked checkout function. Nodes representing the invoice generation function, payment function, and shipment generation function may be directly connected to the root node, as these nodes reference the checkout function as the invoking function. Likewise, nodes representing the database query for storing an invoice may be connected to the node representing the invoice generation function; nodes representing the one or more funds transfer function may be connected to the node representing the payment function; and nodes representing the database query to determine whether a requested item is in stock and the dispatch function may be connected to the node representing the shipment generation function.

Execution graph analyzer 134 is generally configured to receive execution graphs generated for an invoked function in production environment 110 and test environment 120, compare the execution graphs generated for the invoked function, and take one or more actions to manage deployment of an application from test environment 120 to production environment 110 based on the comparison of the execution graphs.

To compare execution graphs generated for an invoked function in production environment 110 and test environment 120, execution graph analyzer may traverse each graph by walking the graph from the root node of the graph to each child node in the graph. As execution graph analyzer 134 traverses the execution graphs, execution graph analyzer 134 can compare the nodes in the execution graphs for the production environment 110 and test environment 120 to determine whether a node in the test environment execution graph exists at the same location as the corresponding node in the production environment execution graph. As execution graph analyzer 134 traverses through the production and test environment execution graphs, execution graph analyzer 134 can maintain a running counter of the number of differences between nodes in the production environment execution graph and the test environment execution graph. This counter may be used, as discussed in further detail below, to determine the extent of the changes made to a function between a production environment 110 and test environment 120 and manage deployment of one or more application components from test environment 120 to production environment 110.

In some embodiments, execution graph analyzer 134 can assume that functions exposed in production environment 110 by production application components 112 and production shared services 114 operate as intended and may take the execution graphs generated for these functions as a canonical representation of the functions exposed in production environment 110. Based on this assumption, if an execution graph for a function implemented in test environment 120 by test application components 122 and/or test shared services 124 are an exact match to the execution graph for the same function implemented in production environment 110 by production application components 112 and/or production shared services 124, execution graph analyzer 134 can assume that the function, as implemented in the test environment 120, operates as intended. Execution graph analyzer 134 may thus allow deployment of application components implementing the function from test environment 120 to production environment 110.

In some embodiments, a developer may indicate to deployment manager 130 that an identified function in production environment 110 does not operate as intended (e.g., generates an incorrect result or otherwise degrades performance of the application). Execution graph analyzer 134 may compare the execution graphs generated for the functions in production environment 110 and test environment 120 and determine whether to deploy or block deployment of the application components associated with the function from test environment 120 to production environment 110. For example, if the execution graphs for the function in the production and test environments are identical or substantially similar, graph analyzer 134 can block deployment of the application components from test environment 120 to production environment 110 until a developer confirms that the application components can be deployed to production environment 110. If, however, the execution graphs for the function in the production and test environments differ by a threshold amount, execution graph analyzer 134 can deploy the application components associated with the function to production environment 110.

If, however, execution graph analyzer 134 determines that the production environment execution graph and test environment execution graph differ, execution graph analyzer 134 may take further action to manage deployment of application components implementing the function from test environment 120 to production environment 110.

In one example, execution graph analyzer 134 may use rules defined for each function or application component to determine whether to deploy application components implementing the function from test environment 120 to production environment 110. Generally, these rules may define a threshold similarity metric used to determine whether application components can be automatically deployed from a test environment 120 to a production environment 110. For example, the threshold similarity metric may be defined as a threshold number of changes to the graph representation for a given function that may be made before execution graph analyzer 134 requests that a developer manually review and approve the changes to a function prior to deployment. The threshold number of changes may be defined, for example, as number of changes to edges or nodes between the production environment execution graph and the test environment execution graph.

A measured difference between the production environment execution graph and the test environment execution graph that is less than a threshold similarity metric may indicate that the functions implemented in the production environment 110 and test environment 120 are substantially similar. Based on this indication, execution graph analyzer 134 can deploy the application components implementing the function to production environment 110. Otherwise, execution graph analyzer 134 can take one or more actions to manage deployment of the application components implementing the function to production environment. Generally, these actions may include temporarily blocking deployment of the application components implementing the function from test environment 120 to production environment 110 and generating a notification to a developer indicating that deployment is blocked pending developer confirmation that the changes reflected in the test environment execution graph are intentional.

If, in response to the notification, a developer indicates to execution graph analyzer 134 that the changes reflected in the test environment execution graph are intentional and did not break the functionality of the software application, execution graph analyzer 134 can unblock deployment of the application components implementing the function. Otherwise, execution graph analyzer 134 can maintain the block on deployment of the application components until subsequent tests are executed against the function, which, as discussed above, may prompt the creation of subsequent execution graphs that may be analyzed by execution graph analyzer 134.

In some embodiments, execution graph analyzer 134 may further generate and transmit, to a developer of the software application, an indication of use cases or application functionality that may be degraded or otherwise affected due to changes identified in a function executing in test environment 120.

Figure 2:
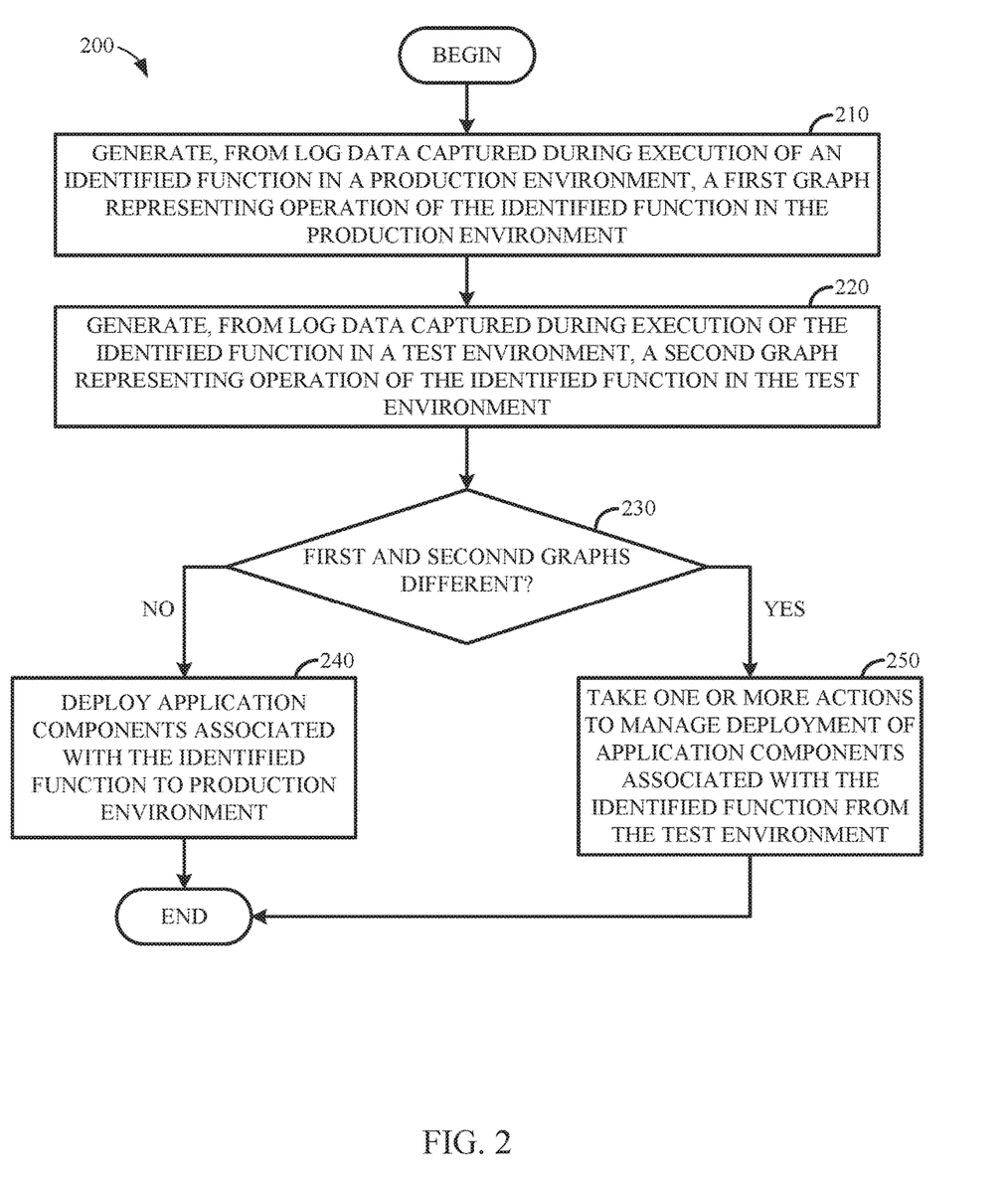
FIG. 2 illustrates example operations for generating execution graphs for a function in a software application and using the generated execution graphs to manage deployment of a software application in a continuous development pipeline.

Example Computer-Implemented Method for
Managing Deployment of Software Application
Components Based On Execution Graphs FIG. 2 illustrates example operations 200 for managing the deployment of software application components to a production environment based on execution graphs generated for functions implemented in a software application. The operations described herein may be performed, for example, in a continuous development pipeline hosting parallel production and test environments that may be dynamically switched as application components are designated as available for use to users of a production software application or other software application deployment systems in which new application components are transferred from a testing environment to a production environment after the code has been tested and debugged.

As illustrated, operations 200 begin at block 210, where a system generates a first execution graph representing operation of an identified function in a production environment of a continuous development pipeline (e.g., production environment 110 in software application deployment environment 100 illustrated in FIG. 1). The first execution graph may be generated from telemetry data captured during execution of the identified function in the production environment. As discussed above, the first execution graph may be generated from a subset of the telemetry data generated during execution of the identified function, and the subset of the telemetry data may include an indication that the telemetry data was generated from a test environment and information about other functions invoked during execution of the identified function, database queries performed during execution of the identified function, remote services invoked during execution of the identified function, and the like. In some embodiments, the telemetry data used to generate the first execution graph may further include information about the data returned from database calls or services invoked during execution of the identified function. The first execution graph may be structured such that the invoked function is a root node of the execution graph, and each level of nodes in the execution graph represent functions performed and/or data consumed or generated by a node in a higher level of the execution graph.

At block 220 the system generates a second execution graph representing operation of the identified function in a test environment of a continuous development pipeline (e.g., test environment 120 in software application deployment environment 120 illustrated in FIG. 1). Like the first execution graph, the second execution graph may be generated from telemetry data captured during execution of the identified function in the test environment, and the telemetry data used to generate the second execution graph may include an indication that the telemetry data was generated from a test environment and information about functions invoked, database calls generated, remote services invoked, other operations performed, and data consumed or generated during execution of the identified function in the test environment.

At block 230, the system compares the first and second execution graphs to determine whether differences exist between the first and second execution graphs. If the first and second execution graphs are identical, the system can determine that no changes have been made to the order of operations defined for the identified function. In some cases, the functionality of application components in a production environment may be assumed to operate as intended. Based on this assumption, the system can determine that a function in a test environment that has an execution graph matching that of the function in the production environment also operates as intended. Thus, operations 200 may proceed to block 240, where the system deploys the application components associated with the identified function to a production environment.

In some embodiments, deployment of the application components associated with the identified function to a production environment may include configuring an API gateway (e.g., API gateway 102 illustrated in FIG. 1) to swap the test and production environments for the identified function such that the test environment becomes the production environment and the production environment becomes the test environment for the identified function. Generally, to swap designations of production and test environments, the API gateway may be configured to route requests to invoke the identified function to the computing environment on which the updated code is deployed by writing, to a routing table, information identifying the location at which the identified function is to be executed. When application components are deemed ready for use in a production environment, the entry in the routing table for the identified function may be modified to reference the other environment than the environment currently included in the entry for the identified function.

In some embodiments, deploying application components from a test environment to a production environment may include copying the application components from the test environment to the production environment. Execution of the application may be paused or terminated prior to overwriting the application components in the production environment with the updated application components from the test environment. In some embodiments, pausing or terminating the application in the production environment may include saving state information associated with each active user session of the application so that users of the application can resume execution of the application without losing data or any progress made in completing a workflow implemented by the application. Once the updated application components are written to the production environment, execution of the application may be resumed.

If, at block 230, the system determines that a difference exists between the first and second execution graphs, operations 200 may proceed to block 250, where the system takes one or more actions to manage deployment of application components associated with the identified function from the test environment. As discussed in further detail below, the system can analyze an amount of the difference between the first and second execution graphs to determine whether the amount of the difference meets a threshold amount that would block automatic deployment of the application components associated with the identified function from the test environment to the production environment.

Figure 3:
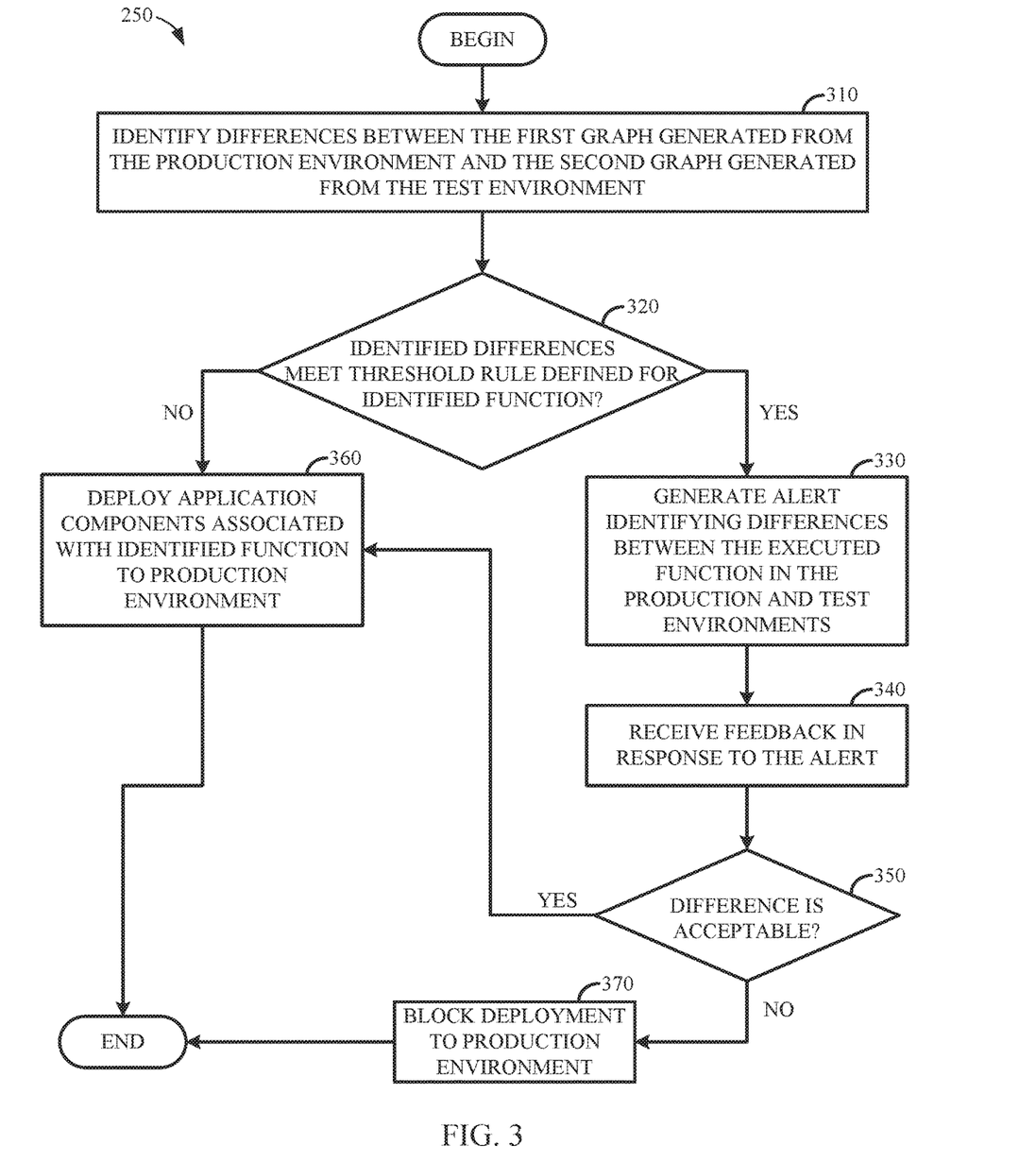
FIG. 3 illustrates example operations for analyzing execution graphs to control deployment of a software application in a continuous development pipeline based on differences identified between execution graphs generated for a function executed in a production and a test environment.

FIG. 3 illustrates further details regarding example operations 250 (in FIG. 2) for managing deployment of application components associated with an identified function from a test environment to a production environment based on differences between execution graphs generated for the identified function from the test and production environments.

As illustrated, operations 250 begin at block 310, where a system identifies differences between the first graph generated from the production environment and the second graph generated from the test environment. In one embodiment, to identify differences between the first and second execution graphs, the system may traverse the first and second execution graphs to determine whether nodes existing at a particular level of a graph exist in both the first and second graphs. If a node exists at the same location in both the first and second execution graphs, the system need not take any action with respect to that node. If, however, a node does not exist in one on the first or second execution graphs, the system may increment a counter used to track the number of nodes that differ between the first and second execution graphs.

At block 320, the system determines if the number of differences between the first and second execution graphs meet a threshold rule defined for the identified function. As discussed, the threshold rule may be, for example, a threshold number of differences between the first and second execution graphs or some other value identifying an amount of changes that exist between the identified function in the test and production environments. In some embodiments, other metrics may be used to determine acceptable or unacceptable differences between the identified function in the production and test environments. For example, metrics used to determine acceptable or unacceptable differences between the identified function in the production and test environments may include execution time metrics defining an amount of time variance in execution time for the identified function in the production and test environments that is acceptable. If the execution time for the identified function increases by a threshold amount, the system can determine that the differences between the first and second execution graphs meet a threshold rule and proceed to block 330, as discussed in further detail below.

If, at block 320, the system determines that the number of differences between the first and second execution graphs meets the threshold rule (e.g., exceed a threshold number of differences), operations 250 may proceed to block 330. At block 330, the system may generate an alert identifying the differences between the identified function in the production and test environments. In some embodiments, the alert may indicate function calls, database calls, remote service invocation, and other operations that are not present in one of the execution graphs for the production or test environments and request that a user (e.g., a developer of the software application) provide feedback with respect to the differences between the function in the test and production environments.

At block 340, the system receives feedback from a user in response to the generated alert. At block 350, the system examines the feedback to determine whether the difference identified between the function in the test and production environments is acceptable to the developer. A difference may be acceptable to a developer, for example, where differences have been tested and verified to not adversely affect the functionality of the software application or improve the performance of the software application. If, at block 350, the system determines that the difference identified between the function in the test and production environments is acceptable to the developer, at block 360, the system deploys the application components associated with the identified function to a production environment. Otherwise, at block 370, the system blocks deployment of the application components associated with the identified function.

If, at block 320, the system determines that the identified differences do not meet a threshold rule defined for the identified function, the system can determine that the amount of changes made to the identified function do not amount of an amount of change that necessitates developer confirmation prior to deployment. Thus, operations 250 may proceed to block 360, where the application components associated with the identified function are deployed to a production environment.

Figure 4A:
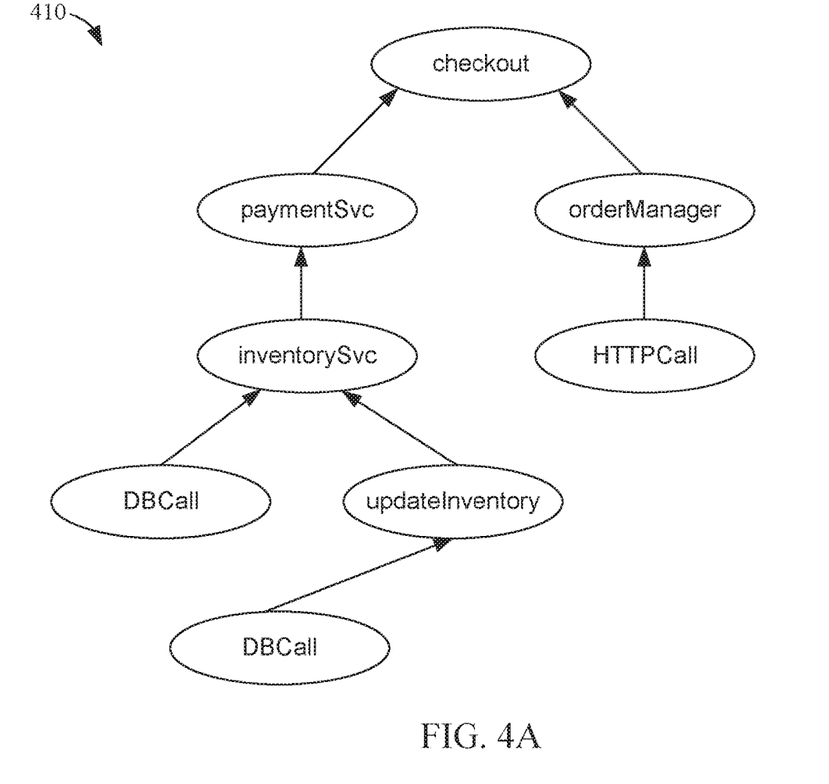
FIGS. 4A and 4B illustrate example execution graphs showing operations performed in executing a function in production and test environments in a continuous development pipeline.
Figure 4B:
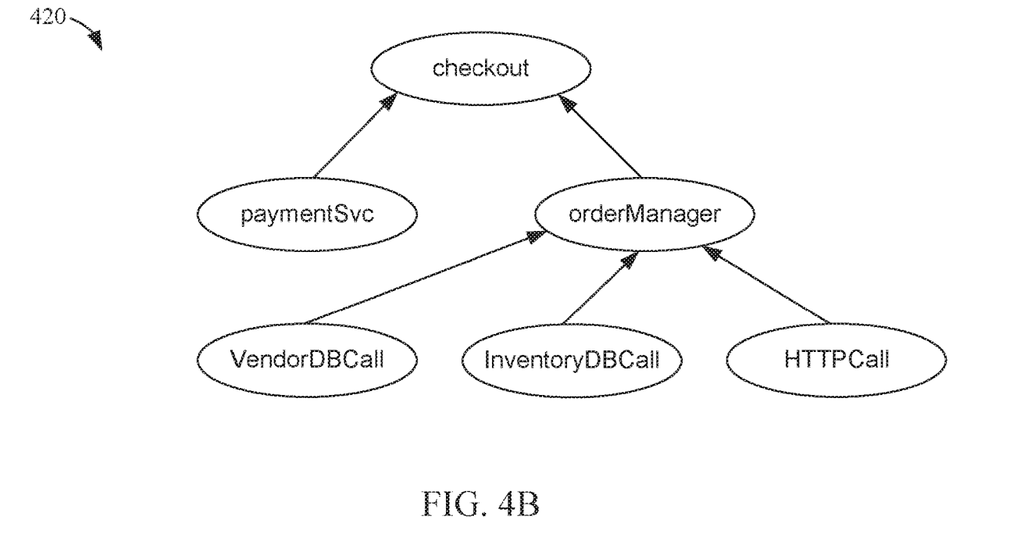

Example Execution Graphs for Managing Deployment of Software Application Components in a Continuous Development Pipeline FIGS. 4A and 4B illustrate example execution graphs for a function in a software application that may be used to manage deployment of software application components in a continuous development pipeline.

Execution graph 410 illustrates a checkout function implemented by one or more application components deployed in a production environment (e.g., production environment 110 illustrated in FIG. 1). As illustrated, execution graph 410 includes the checkout function as a root node and indicates that the checkout function invokes two services—paymentSvc and orderManager—illustrated in nodes one level below the root node. The paymentSvc node invokes a service, inventorySvc, and orderManager invokes an HTTP call, both of which are illustrated two levels below the root node. The inventorySvc node in turn performs a database call for obtaining vendor information and the updateInventory function, both of which are illustrated three levels below the root node. Finally, the updateInventory function invokes its own database call, illustrated four levels below the root node.

Execution graph 420 illustrates a checkout function implemented by one or more application components deployed in a test environment (e.g., test environment 120 illustrated in FIG. 2). As illustrated, execution graph 420 may represent the execution flow of a function that has been optimized to reduce the number of operations performed in order to execute the function. Like execution graph 410, execution graph 420 includes the checkout function as a root node. The checkout function invokes the paymentSvc and orderManager services, both of which are illustrated as nodes one level below the root node. The orderManager service, which combines the functionality of various nodes illustrated in execution graph 410, invokes a vendor database call, an inventory database call, and an HTTP call, each of which is illustrated as nodes two levels below the root node.

Execution graph analyzer 134 may traverse execution graphs 410 and 420 and identify the differences between the execution graphs 410 and 420. These differences, as illustrated, include the elimination of the inventorySvc node and its child nodes from execution graph 410 and the addition of two distinct database calls in execution graph 420, for a total of 7 different nodes between execution graph 410 from production environment 110 and execution graph 420 from test environment 120. Based on a rule specifying that changes involving more than a threshold number of nodes may need developer review prior to deployment of the application components associated with the checkout function to a production environment, execution graph analyzer 134 can block deployment of the application components until a developer confirms that the changes may be deployed to the production environment.

Figure 5:
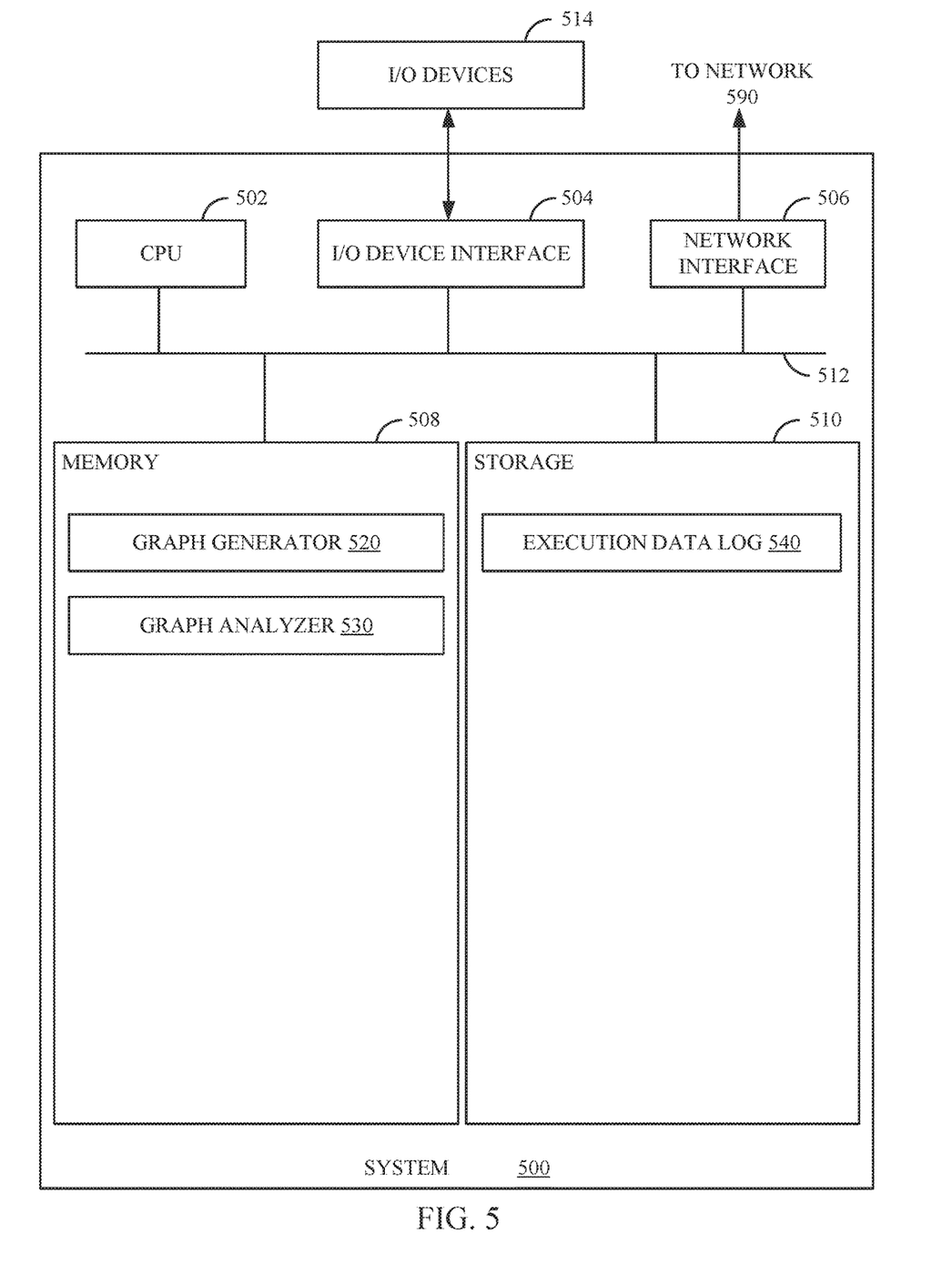
FIG. 5 illustrates an example computing system with which embodiments of the present disclosure may be implemented.

Example System for Managing Deployment of Software Application Components in a Continuous Development Pipeline Based On Execution Graphs FIG. 5 illustrates an example system 500 for managing deployment of software application components in a continuous development pipeline based on execution graphs generated for functions in a software application. For example, system 500 may be representative of deployment manager 130 illustrated in FIG. 1.

As shown, system 500 includes a central processing unit (CPU) 502, one or more I/O device interfaces 504 that may allow for the connection of various I/O devices 515 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Storage 510 is representative of a non-volatile memory, such as a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Memory 508 is representative of a volatile memory, such as a random access memory, or a nonvolatile memory, such as nonvolatile random access memory, phase change random access memory, or the like. As shown, memory 508 includes a graph generator 520 and a graph analyzer 530.

As described above, graph generator 520 is generally configured to obtain telemetry data from an execution log data store (e.g., a remotely located execution log data store 140 illustrated in FIG. 1 or execution data log 540 in storage 510) and generate execution graphs for an identified function in production and test environments in a software application development environment.

As discussed, the graphs generated by graph generator 520 may be structured such that an identified function is included as a root node of the generated graphs, and successively lower levels of the generated graphs represent functions invoked, database calls generated, remote system calls generated, and/or data consumed or generated by higher-level nodes in the graph.

Graph analyzer 530 uses the generated execution graphs for an identified function in production and test environments of the software application development environment to determine whether to allow or block deployment of application components associated with the identified function. As discussed, the determination of whether to allow or block deployment of application components associated with an identified function may be based on rules identifying a threshold amount of changes between the execution graphs generated from the production and test environments. If the amount of change between the execution graphs generated from the production and test environments is less than a threshold amount, graph analyzer 530 can deploy the application components associated with the identified function to a production environment; otherwise, graph analyzer 530 can generate an alert requesting that a developer confirm that the changes to the identified function were intentional prior to deploying the application components associated with the identified function to the production environment. In some embodiments, to deploy application components associated with the identified function from a test environment to a production environment, graph analyzer 530 writes routing information to a routing table of an API gateway identifying the computer system that is to process requests to invoke an identified function. In some embodiments, graph analyzer 530 can copy application components from a test environment to a production environment to deploy the identified function to the production environment.

Storage 510, as illustrated, may include an execution data log 540. Execution data log 540 generally stores telemetry data captured from monitoring activity generated during execution of application components and shared components in production environment 110 and test environment 120. This telemetry data may include, for example, information about function calls generated during execution of an application in production environment 110 and test environment 120, database calls, remote service invocation (e.g., through HTTP service calls), data generated or consumed during execution of an application, and other information that may be used to generate execution graphs for use by graph analyzer 530 to allow or block deployment of application components to a production environment. While FIG. 5 illustrates execution data log 540 stored in storage 510, it should be recognized that graph generator 520 and graph analyzer 530 may obtain telemetry data stored in a remote data store via network interface 506 for use in generating execution graphs for a function in production and test environments and determining, based on the generated execution graphs, whether to deploy application components associated with the function to a production environment.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for managing deployment of software application components in a continuous development pipeline, comprising:

generating, from log data captured during execution of a function in a production environment, a first graph representation of actions performed during the execution of the function in the production environment;

generating, from log data captured during execution of the function in a test environment, a second graph representation of actions performed during the execution of the function in the test environment;

identifying differences between the first graph representation of the actions performed during the execution of the function in the production environment and the second graph representation of the actions performed during the execution of the function in the test environment, wherein the identifying includes:

traversing the first graph representation and the second graph representation, and incrementing a difference counter for each node found in one of the first or second graph representations and absent in another of the first or second graph representations and for each node present in both of the first graph representation and the second graph representation but in a different location in the first and second graph representations; and based on the identified differences and a rule for the function defining an acceptable number of differences between the first graph representation and the second graph representation, taking one or more actions to manage deployment of software application components implementing the function from the test environment to the production environment.

2. The method of claim 1, wherein the log data captured during execution of the function comprises information identifying one or more of function calls invoked during execution of the function, database calls generated during execution of the function, remote services invoked during execution of the function, or data consumed or generated during execution of the function.

3. The method of claim 1, wherein generating the first graph representation of the actions performed during execution of the function in the production environment and the second graph representation of the actions performed during execution of the function in the test environment comprises:
  filtering the log data captured during execution of the function in the production environment and the log data captured during execution of the function in the test environment to remove information unrelated to system calls from the log data captured during execution of the function in the production environment and the log data captured during execution of the function in the test environment; and
  generating the first graph representation and the second graph representation of actions performed during execution of the function based on the filtered first and second log data.

4. The method of claim 1, wherein taking one or more actions to manage deployment of the software application components implementing the function from the test environment to the production environment, comprises:
  determining that the difference counter is less than a threshold value established for the function; and
  deploying the software application components implementing the function to the production environment.

5. The method of claim 4, wherein deploying the software application components implementing the function to the production environment comprises:
  configuring an application programming interface (API) gateway to route requests to invoke the function to a second environment such that the second environment becomes the production environment and a first environment becomes the test environment with respect to the function.

6. The method of claim 1, wherein taking one or more actions to manage deployment of the software application components implementing the function from the test environment to the production environment comprises:
  determining that the difference counter exceeds a threshold value for the function; and
  blocking deployment of the software application components implementing the function from the test environment to the production environment.

7. The method of claim 6, further comprising:
  generating an alert to a developer associated with the software application components implementing the function, the alert indicating differences identified between the function implemented in the production environment and the function implemented in the test environment.

8. The method of claim 7, further comprising:
  responsive to the alert, receiving information indicating that the software application components may be deployed to the production environment; and
  deploying the software application components from the test environment to the production environment.

9. The method of claim 7, wherein the alert includes information identifying use cases in a software application affected by changes implemented to the function in the test environment.

10. A system, comprising:
  a processor; and
  a memory having instructions stored thereon which, when executed by the processor, performs an operation for managing deployment of software application components in a continuous development pipeline, the operation comprising:
    generating, from log data captured during execution of a function in a production environment, a first graph representation of actions performed during the execution of the function in the production environment;
    generating, from log data captured during execution of the function in a test environment, a second graph representation of actions performed during the execution of the function in the test environment;
    identifying differences between the first graph representation of the actions performed during the execution of the function in the production environment and the second graph representation of the actions performed during the execution of the function in the test environment, wherein the identifying includes:
      traversing the first graph representation and the second graph representation, and
      incrementing a difference counter for each node found in one of the first or second graph representations and absent in an other of the first or second graph representations and for each node present in both of the first graph representation and the second graph representation but in a different location in the first and second graph representations; and
    based on the identified differences and a rule for the function defining an acceptable number of differences between the first graph representation and the second graph representation, taking one or more actions to manage deployment of software application components implementing the function from the test environment to the production environment.

11. The system of claim 10, wherein generating the first graph representation of the actions performed during execution of the function in the production environment and the second graph representation of the actions performed during execution of the function in the test environment comprise:
  filtering the log data captured during execution of the function in the production environment and the log data captured during execution of the function in the test environment to remove information unrelated to system calls from the log data captured during execution of the function in the production environment and the log data captured during execution of the function in the test environment, and
  generating the first graph representation and the second graph representation of actions performed during execution of the function based on the filtered first and second log data.

12. The system of claim 10, wherein taking one or more actions to manage deployment of the software application components implementing the function from the test environment to the production environment comprises:
  determining that the difference counter is less than a threshold value established for the function; and
  deploying the software application components implementing the function to the production environment.

13. The system of claim 12, wherein deploying the software application components implementing the function to the production environment comprises:
  configuring an application programming interface (API) gateway to route requests to invoke the function to a second environment such that the second environment becomes the production environment and a first environment becomes the test environment with respect to the function.

14. The system of claim 10, wherein taking one or more actions to manage deployment of the software application components implementing the function from the test environment to the production environment comprises:
  determining that the difference counter exceeds a threshold value for the function; and
  blocking deployment of the software application components implementing the function from the test environment to the production environment.

15. The system of claim 14, further comprising:
  generating an alert to a developer associated with the software application components implementing the function, the alert indicating differences identified between the function implemented in the production environment and the function implemented in the test environment.

16. The system of claim 15, further comprising:
  responsive to the alert, receiving information indicating that the software application components may be deployed to the production environment; and
  deploying the software application components from the test environment to the production environment.

17. The system of claim 15, wherein the alert includes information identifying use cases in a software application affected by changes implemented to the function in the test environment.

18. A computer-readable medium having instructions stored thereon which, when executed by one or more processors, performs an operation for managing deployment of software application components in a continuous development pipeline, the operation comprising:
  generating, from log data captured during execution of a function in a production environment, a first graph representation of actions performed during the execution of the function in the production environment;
  generating, from log data captured during execution of the function in a test environment, a second graph representation of actions performed during the execution of the function in the test environment;
  identifying differences between the first graph representation of the actions performed during the execution of the function in the production environment and the second graph representation of the actions performed during the execution of the function in the test environment, wherein the identifying includes,
    traversing the first graph representation and the second graph representation, and
    incrementing, a difference counter for each node found in one of the first or second graph representations and absent in an other of the first or second graph representations and for each node present in both of the first graph representation and the second graph representation but in a different location in the first and second graph representations; and
  based on the identified differences and a rule for the function defining an acceptable number of differences between the first graph representation and the second graph representation, taking one or more actions to manage deployment of software application components implementing the function from the test environment to the production environment.

19. The method of claim 4, wherein deploying the software application components implementing the function to the production environment comprises:
  pausing execution of the software application in the production environment;
  saving state information associated with each active user session of the software application; and
  writing an update to the software application from the test environment to the production environment.

20. The method of claim 19, further comprising:
  restoring the saved state information associated with each active user session of the software application; and
  resuming execution of the software application based on the update written from the test environment to the production environment.

* * * * *